(12) United States Patent
Kochura

(10) Patent No.: US 10,169,006 B2
(45) Date of Patent: Jan. 1, 2019

(54) COMPUTER-VISION BASED EXECUTION OF GRAPHICAL USER INTERFACE (GUI) APPLICATION ACTIONS

(71) Applicant: International Business Machines Corporation, Armonk, NY (US)

(72) Inventor: Nadiya Kochura, Bolton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 791 days.

(21) Appl. No.: 14/843,314

(22) Filed: Sep. 2, 2015

(65) Prior Publication Data

US 2017/0060368 A1    Mar. 2, 2017

(51) Int. Cl.
*G06F 9/44*    (2018.01)
*G06F 8/38*    (2018.01)
*G06F 9/451*   (2018.01)

(52) U.S. Cl.
CPC ............... *G06F 8/38* (2013.01); *G06F 9/451* (2018.02)

(58) Field of Classification Search
CPC ........................................................ G06F 9/44
USPC ................................................. 717/120–123
See application file for complete search history.

(56) References Cited

U.S. PATENT DOCUMENTS

| 8,401,221 B2 | 3/2013 | Milov et al. |
| 8,595,636 B2 | 11/2013 | Bergman et al. |
| 2007/0083813 A1* | 4/2007 | Lui .................. G06F 11/3612 715/709 |
| 2011/0047488 A1 | 2/2011 | Butin et al. |
| 2012/0102428 A1* | 4/2012 | Stewart .................. G06F 3/038 715/781 |
| 2012/0243745 A1 | 9/2012 | Amintafreshi |
| 2014/0325484 A1 | 10/2014 | Gillaspie et al. |
| 2015/0058776 A1* | 2/2015 | Liu ..................... G06F 3/04842 715/771 |

(Continued)

OTHER PUBLICATIONS

Tsung-Hsiang Chang, et al., GUI Testing Using Computer Vision, In Proceedings of the 28th International Conference on Human Factors in Computing Systems, 2010, pp. 1535-1544, Association for Computing Machinery (ACM), New York, NY, USA.

(Continued)

*Primary Examiner* — Jae U Jeon
(74) *Attorney, Agent, or Firm* — Lee Law, PLLC; Christopher B. Lee

(57) ABSTRACT

Using computer-vision based training information, a user interface (UI) component of an application-level user interface of an application and rendering coordinates of the UI component within the application-level user interface are recognized. A functional class that is mapped within the computer-vision based training information to the UI component and that is used to instantiate the UI component as part of the application-level user interface is identified in accordance with the computer-vision based training information. A replica object of the identified functional class is instantiated within a user interface container separately from the application. An operating system-level event that specifies a functional operation of the UI component and the recognized rendering coordinates of the UI component is generated from the instantiated replica object on an operating system event queue that provides inputs to the application.

17 Claims, 4 Drawing Sheets

(56) References Cited

U.S. PATENT DOCUMENTS

2015/0082280 A1   3/2015   Betak et al.

OTHER PUBLICATIONS

Anastasia Dubrovina, et al., Efficient and robust image descriptor for GUI object classification, In Proceedings of 2012 21st IEEE International Conference on Pattern Recognition, First Published Oct. 22, 2011, pp. 1-10, IEEE and Hewlett-Packard Development Company, L.P., Tsukuba, Japan.

* cited by examiner

COMPUTER-VISION BASED EXECUTION OF GRAPHICAL USER INTERFACE (GUI) APPLICATION ACTIONS

BACKGROUND

The present invention relates to user interface application input. More particularly, the present invention relates to computer-vision based execution of graphical user interface (GUI) application actions.

Computing applications may be designed to provide a graphical user interface (GUI) that is displayed on a display device. The computing applications allow users to utilize input devices, such as a keyboard and mouse, to enter text and perform selections within the displayed graphical user interface.

SUMMARY

A computer-implemented method includes recognizing, using computer-vision based training information, a user interface (UI) component of an application-level user interface of an application and rendering coordinates of the UI component within the application-level user interface; identifying, in accordance with the computer-vision based training information, a functional class that is mapped within the computer-vision based training information to the UI component and that is used to instantiate the UI component as part of the application-level user interface; instantiating a replica object of the identified functional class within a user interface container separately from the application; and generating, from the instantiated replica object on an operating system event queue that provides inputs to the application, an operating system-level event that specifies a functional operation of the UI component and the recognized rendering coordinates of the UI component.

A system that performs the computer-implemented method and a computer program product that causes a computer to perform the computer-implemented method are also described.

DETAILED DESCRIPTION

Figure 1:
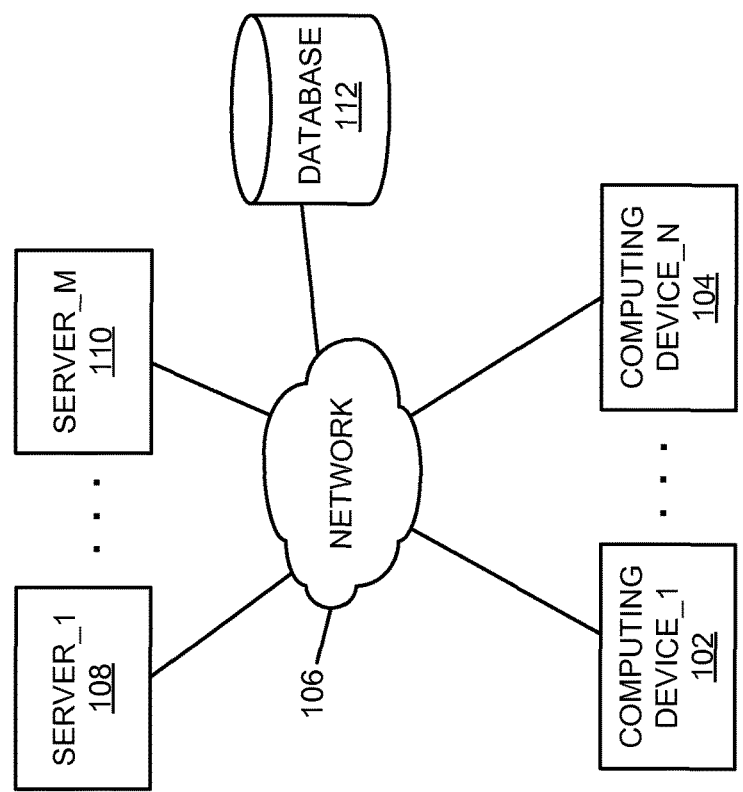
FIG. 1 is a block diagram of an example of an implementation of a system for computer-vision based execution of graphical user interface (GUI) application actions according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides computer-vision (i.e., image recognition) based execution of graphical user interface (GUI) application actions. The present technology solves a recognized user interface input problem for both GUI testing and use by providing technology that includes a new form of computing client device that autonomously recognizes user input fields and selection options (e.g., buttons, drop down elements, etc.) within a graphical user interface (GUI) of an application, that autonomously identifies locations of the input fields/selection options within the GUI, and that programmatically provides GUI location-based operating system-level application input and selection actions to the application (e.g., without use of conventional user input devices, such as a keyboard, mouse, etc.). As such, the technology described herein may improve computational processing within complex computing environments where user interface devices are unavailable, or where a user is unable or chooses not to manipulate any available user interface device(s). The technology described herein may further improve computing device autonomous operation.

The technology described herein recognizes, using computer-vision based training information, a user interface (UI) component of an application-level graphical user interface of an application and rendering coordinates of the UI component within the application-level graphical user interface. In accordance with the computer-vision based training information, a functional class that is mapped within the computer-vision based training information to the UI component and that is used to instantiate the UI component as part of the application-level user interface is identified. A replica object of the identified functional class is instantiated within a user interface container separately from the application. An operating system-level event that specifies a functional operation of the UI component and the recognized rendering coordinates of the UI component is generated from the instantiated replica object on an operating system event queue that provides inputs to the application.

The automated computer-vision based execution of graphical user interface (GUI) application actions described herein is based upon machine learning to allow a computing device to learn user interface component appearances of an application and to determine locations of actual user interface components within the application in real time (even if the locations change during development over time or across different execution platforms). Real inputs may be passed to the application by instantiation and use of a replica user interface component that drives application inputs to the application by way of the operating system (OS). The technology described herein operates independently of execution of the application and independently of any particular execution platform, allowing automation of testing of applications across different execution platforms as user interface design changes over time, and allowing application users freedom from conventional application input restrictions.

The technology described herein applies a two-stage machine learning (ML) technique to construct an autonomous UI (AUI) controller (alternatively termed a smart UI controller ("SUI" controller) herein). The AUI controller as described herein is partitioned for purposes of example as a multi-module cognitive computing platform with delegation of different ML functionality for a first stage of AUI training and a second stage of AUI execution to a collection of sub-modules, as described further below. It should be understood that the AUI controller may alternatively be implemented as a single module or with other partitioning as appropriate for a given implementation.

As an introduction to the first stage of AUI training, the technology described herein utilizes user interface (UI) controller training to train the AUI controller to identify/recognize, using computer-visioning (i.e., image recognition), a set of UI images corresponding to UI components or groups of UI components that form application-level user interfaces (e.g., user interface screens, dialog boxes, buttons, check boxes, etc.). The UI components may include text input fields, enter and cancel buttons, radio buttons, check boxes, and other forms of user interface elements that may be utilized to configure an application user interface. It is understood that the different UI components may be presented within different applications and even by the same application on different platforms in a variety of shapes and sizes, and that the ML and computer vision may identify a variety of UI components presented on a user interface in a variety of shapes and sizes. The training further includes training regarding what operations may be performed with the corresponding UI components, and thereby at a higher level with the application-level user interfaces themselves, by the AUI controller.

Actions may be associated with and mapped to the trained UI components to facilitate autonomous determinations of information to be entered into a user interface. The actions associated with the UI components may be configured in accordance with the UI component context within the respective UI display screen or dialog box. The UI component context may include UI instructions to a user, such as "hit enter to proceed," or other context as appropriate for a given implementation. As such, the surrounding contextual text or other information may guide a decision by the AUI controller regarding information input. Execution flow may further be driven autonomously by an externally-provided script with the set of commands that provide information inputs.

As an introduction to the second stage of AUI execution, execution flow may utilize operating system-level application inputs generated to carry out the associated user interface actions. The technology utilized to generate and carry out the user interface actions in association with identified UI components is described in more detail below. The present technology generates and executes GUI commands that originate from outside of the real/target application. The technology may abstract a presentation layer replica user interface (UI) that is separate from the real/target application flow, and may pass GUI commands generated by the replica UI to the real/target application at the operating system level to drive the real/target application.

As such, machine learning (ML) and computer vision (e.g., image recognition) of user interface (UI) components of an application may be performed to identify the different user interface elements programmatically, and to thereby identify appropriate operating system level inputs to the application. The programmatic ML and computer vision may operate to remove cross-platform and conventional user interface limitations.

Given the flexibility across platforms by which the present technology may be implemented, the technology described herein provides a flexible interface that may be self-adaptable to GUI development changes, and independent from the application execution environment utilized for GUI automation. Because of the programmatic ML and computer vision identification of UI components, the technology described herein may be implemented without use of previously-recorded UI test sessions (that would be inoperative if locations of GUI components changed over time), and as such provides additional flexibility, maintainability, and improved autonomous GUI operation. In contrast to recording-session type implementations, the technology described herein may be implemented by complementing image recognition of UI components with the knowledge of corresponding UI classes and UI actions associated with the respective UI classes used to instantiate the respective UI components. By correlation of UI classes and UI actions with image recognition of UI components instantiated from the respective UI classes, adaptation to GUI development changes and independence of runtime execution environment may be achieved. As such, the technology described herein may be implemented autonomously and flexibly across different web browsers, operating systems, and other platform-specific technologies.

Further details of the two stages, the training stage and the execution stage, will now be described. During the training stage, a GUI classifier module may be trained to recognize various UI objects, such as a rich edit textbox, toolbars, a menu bar, a status bar, a ruler, scroll bars, buttons (e.g., enter, radio buttons), checkboxes, and other UI elements. For each object, predefined user interface action(s) may be trained for execution, such as a mouse click, selection/deselection of a radio button, selection/deselection of a check box, icon and push button, text typed into and/or read from a text field, drag operations on scroll bars, and other user interface actions. Machine learning of multi-label classification algorithms (e.g., neural network, k-means clustering, etc.) may be applied at the training stage to associate/correlate UI components with the underlying predefined system/application actions that may be performed on behalf of the various UI components during the execution stage. The training for object recognition may be performed by processing GUI screenshots and UI object image bitmaps from the training data sets. The training data sets may include UI object image bitmaps that may be mapped to the object class for the associated UI object, which may then be used to create a mapping from the UI objects to the predefined system/application actions associated with the UI objects.

Further regarding the training data sets, the training data sets may include digitized image vectors of the respective UI objects and/or of UI object groups. The image vectors may be transformed using machine learning and/or image recognition techniques as described herein, such as dimensionality reduction and converting from a red/green/blue (RGB) color space to a hue situation value (HSV) color space, or other conversions as appropriate for a given implementation. For example, principal component analysis (PCA) may also/alternatively be utilized to perform dimensionality reduction. Collectively, these forms of dimensionality reduction and conversion techniques may be applied during the execution stage to recognize variations of UI objects (e.g., larger or smaller UI components) across different user interface screens/dialogs and across different applications, and across different execution platforms for the same or different applications. As such, these forms of dimensionality reduction and conversion techniques may provide a platform and application independence during the execution stage of the technology as described herein to facilitate autonomous operations associated with GUI controls.

GUI scripts may be defined from the mapped set of GUI commands and associated with the respective UI objects/components (e.g., component class and/or instance identifiers). The GUI scripts may be used to implement an external set of GUI commands and/or entry of the GUI commands through an interactive user session with a particular GUI. UI class labels that uniquely identify the respective UI components may be incorporated into the scripts to allow the respective classes to be instantiated during the execution stage, as described in more detail below. Different available class functions of the UI components may each be mapped to a functional action that may be triggered from the respective GUI script. As described in more detail below, the GUI scripts may provide a functional interface to replicated instantiated UI components that are used to externally drive application execution during runtime.

Regarding GUI scripts that may be used to instantiate and perform operations on replica UI components, the GUI scripts may define or specify UI classes usable to instantiate the respective UI components, and may specify/define corresponding functional actions (e.g., methods) that perform the appropriate processing actions at runtime. As an example of GUI script processing for a UI class object of "radio button," when a first instance of a radio button class is instantiated within the application with an instance label of "radioButton1," the respective GUI command script may be configured for a "select event" as "selectEvent, radioButton1, select=true." As such, in response to execution stage processing intended to select the respective radioButton1, an operating system-level select event may be generated to the real/target application to cause selection of the radioButton1 instance within the real/target application. Additional GUI scripts may be created in a similar manner for a variety of UI components in accordance with the description herein or differently as appropriate for the given implementation.

As an additional example of user interface use, the training may be configured to allow the user during use of the application to verbally command application operations to be autonomously performed by the AUI controller (e.g., "log in" with reference to a particular application), and the trained actions may include knowledge of how to initiate/start the real/target application from the user interface, how to navigate to and identify a pair of login text fields (e.g., username and password) for entry of log in information, and what information to enter on behalf of the user. Further, because the technology described herein operates using UI component recognition, if the user interface to the application were to change, the new user interface may be examined in accordance with the training to autonomously find the login information entry fields regardless of where they are located on the screen within the new user interface, and to carry out the trained login operations.

During the execution stage (e.g., at runtime) GUI application screenshot images may be passed to an AUI controller analyzer module for determination of the various types of UI components within the particular user interface of the real application. An AUI execution analytical module may provide analytical and execution functions for processing runtime images of user interface components. At runtime, the AUI execution analytical module may receive GUI application screenshot images and may generate digitized image vectors of the GUI application screenshot images. UI object images may be extracted from the GUI application screenshot images and classified by a GUI classifier module. The AUI execution analytical module may apply the respective GUI classifier module for image analysis and processing. The AUI execution analytical module may provide functions for translating recognized UI image location properties (e.g., X,Y screen coordinates) and may map the recognized UI image and coordinates to the respective UI object class and UI action (e.g., a selection action, etc.). With the UI object class identified, the AUI execution analytical module may create a UI component instance of that UI object class, place the instantiated UI component instance within a UI container (e.g., a stand-alone/separate UI container) using absolute positioning layout derived from the recognized UI image location properties (e.g., the X,Y screen coordinates), and may trigger the appropriate/configured UI action on that instantiated UI component within the UI container.

As such, the identified classes of UI objects may be separately instantiated within a separate UI container to create a replica UI component object instance of the "real" application UI component that has been identified/recognized within the user interface of the application. The replica UI component may then be used via the GUI scripts to mimic the real application component to generate real OS-level inputs to the application. Corresponding UI actions may be triggered on the instantiated replica UI component using the GUI scripts as described above.

Because the instantiated replica UI component is of the same class/type as the real application UI component, the actions performed on this replica UI component produce real UI component output that may operate as real UI system-level events to the real/target application. The real UI system-level events generated by the replica UI component may then be placed in the real operating system (OS) event queue for the real/target application. As such, the output of the instantiated UI component may be passed directly to the operating system level (OS level) and propagated by the OS as an OS event to the application as if the real application instantiated UI component had created the respective OS event. The real/target application event listener receives and processes the replica-generated events from the OS. The application continues execution by use of the OS event that resulted from the replicated instantiated component to drive the application using the computer-vision based execution of graphical user interface (GUI) application actions described herein.

The concept of an application or user interface component being "in focus" within display-based user interfaces is understood for purposes of the present description to represent which UI component of a group of UI components is in a foreground of a graphical user interface (e.g., on top of other application user interface components) and as such ready to accept user inputs from user input devices (e.g., mouse clicks, typing from a keyboard, etc.). The in-focus application that accepts/receives the user inputs utilizes or produces output according to the user inputs (e.g., output text to the display, process an "ENTER" key selection or mouse click).

The technology described herein changes conventional computing technology by providing for processing to drive inputs to UI components (e.g., application user interface panes, dialog boxes, etc.) that are "not" in focus within a GUI environment. To implement non-focus-based UI component inputs, multiple buffered screenshot display images of different application UI components and/or applications may be utilized and processed. Each buffered screenshot may have a different application and UI component (e.g., dialog box) captured for alternative rendered screen presentations (e.g., by ALT-Tab action for example). By performing the processing described herein using the different buffered screenshot display images (each with a different display representation of different application UI components and/or applications), UI components may be identified within the respective buffered screenshot display images and inputs may be provided directly to each of the different UI components and/or different applications without requiring the respective applications to be brought into "focus" within the GUI. As such, multiple applications/interfaces may be processed concurrently without limitations that would otherwise exist if only the rendered images as actually displayed on a screen at any particular point in time were used (e.g., where one application is in focus to receive all generated user inputs). The respective application inputs for different UI components and different applications may be provided to the respective user interface components/applications via the operating system queue for the respective application as otherwise described herein, such as by use of the appropriate instance ID of the user interface component and application identifier (ID) that each uniquely identifies the respective application. Accordingly, the technology described herein transcends the boundaries of conventional computing, and improves computing technology itself.

The AUI controller may also be configured with a reporting capability for logging application actions, failures, and other status. For example, if a UI image has not been recognized from the training stage image configurations, a log may be generated to improve the training stage operations to allow recognition of the respective UI component. Further, runtime exceptions may be logged, along with other processing to provide a feedback loop for improvement of the technology over time.

It should be noted that in addition to being used as a primary user interface technology by application users, the technology described herein may be utilized for testing applications. For example, the technology described herein may "drive" and test an application under test through various execution paths. The execution paths may be implemented to exercise/test various use cases for the application under test.

Testing of an application that generates exceptions may also be performed. The application under test may be interrupted by a runtime exception, and an exception message dialog box may be generated that expects some user action (e.g., click on either an "OK," or "cancel" button located on this message dialog box). The AUI controller may obtain the screenshot image, recognize the exception message dialog, calculate the location for a low-level mouse-click event, and submit the low-level mouse-click event to the OS queue. The application under test event listener may accept this event and proceed with the execution of application.

Testing of a GUI design may also be performed. Where the GUI of the application under test may introduce a new user interface design, the technology described herein may train GUI models based on the new design images. Support for test-driven development (TDD) may be provided, where testing is performed incrementally along with development activities. UI object designs and runtime images may be compared, and possible mismatches may be identified. Adaptation to user interface changes over time may also be implemented, such that where the user interface of the application under test introduces some changes to the user interface design (e.g., a location changes of GUI buttons), the user interface testing may continue to execute test scenarios without interruption because it calculates locations of user interface elements in real time. As such, the technology described herein is not limited to a particular version or arrangement of user interface elements to provide testing of user interfaces.

Monitoring of GUI applications may also be performed. For example, the AUI controller may be used in "passive only mode" as a monitoring tool, where UI actions that are identified are monitored for user responses rather than generated as input to the application. At runtime, the AUI controller may recognize specific UI component status and report on the recognized status. As such, the technology described herein may further improve application user interface ease of use and/or use efficiency analysis by test participants that are assisting with testing user interfaces of applications under test.

It should be noted that conception of the present subject matter resulted from recognition of certain limitations associated with conventional approaches to application input automation. It was observed that conventional automation tools for GUI application execution are limited because, to generate operating system-level application inputs correctly, they depend upon fixed/known user interface element locations within a particular GUI design interface that operate on a specific execution platform. For example, one such conventional technology that utilizes record-playback of user inputs is limited to particular display locations of UI elements (e.g., text input fields, button locations, etc.), such that if the locations of the user interface input elements within the GUI design are changed, the conventional automation that relies upon specific component locations will fail because the recorded UI element location information provided to the operating system (OS) by the playback is different from the locations captured during the recording of the user inputs. It was further observed that identification of a particular UI object(s) on the display screen is a problem with conventional automation tools for GUI application execution. It was also observed that in many cases, GUI applications are tested and executed within different environments (e.g., browsers, platforms, operating systems, etc.). These runtime environment changes between testing and execution may also result in different GUI element locations, as well as different runtime exceptions with different message dialog boxes that have to be processed within the different execution environments. It was determined that, for GUI automation to operate effectively within and across execution environments, new technology that provides a set of technological innovations was desirable. The new technology described here may identify UI objects within a given execution environment, and process different types of exceptions and message dialog boxes in an automated manner (by identification of the respective UI objects) to allow continued execution of the application without disruption. The technology described herein may further provide a more flexible GUI automation that adapts to GUI changes and that is independent of the execution environment within which the GUI automation is performed. The present subject matter improves GUI automation by providing for computer-vision based execution of graphical user interface (GUI) application actions, as described above and in more detail below. As such, improved user interface automation may be obtained through use of the present technology.

The computer-vision based execution of graphical user interface (GUI) application actions described herein may be performed in real time to allow prompt application input without use of a conventional user input device. For purposes of the present description, real time shall include any time frame of sufficiently short duration as to provide reasonable response time for information processing acceptable to a user of the subject matter described. Additionally, the term "real time" shall include what is commonly termed "near real time"-generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for computer-vision based execution of graphical user interface (GUI) application actions. A computing device_1 102 through a computing device_N 104 communicate via a network 106 with several other devices. The other devices may include a server_1 108 through a server_M 110, and a database 112.

As will be described in more detail below in association with FIG. 2 through FIG. 4, the computing device_1 102 through the computing device_N 104 and/or the server_1 108 through the server_M 110 may each provide automated computer-vision based execution of graphical user interface (GUI) application actions. As described above, the automated computer-vision based execution of graphical user interface (GUI) application actions is based upon machine learning to allow a computing device to learn user interface component appearances, determine locations of actual user interface components, and generate real inputs to the application by instantiation and use of a replica user interface component. Because the technology described herein operates independently of execution of the application, the application itself does not have to be modified. As such, the present technology may be implemented at a user computing device or server device level, or by a combination of such devices as appropriate for a given implementation. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, via a network, such as the network 106. As such, the server_1 108 through the server_M 110 may each include a web server, application server, or other data server device.

The database 112 may include a relational database, an object database, or any other storage type of device. As such, the database 112 may be implemented as appropriate for a given implementation.

Figure 2:
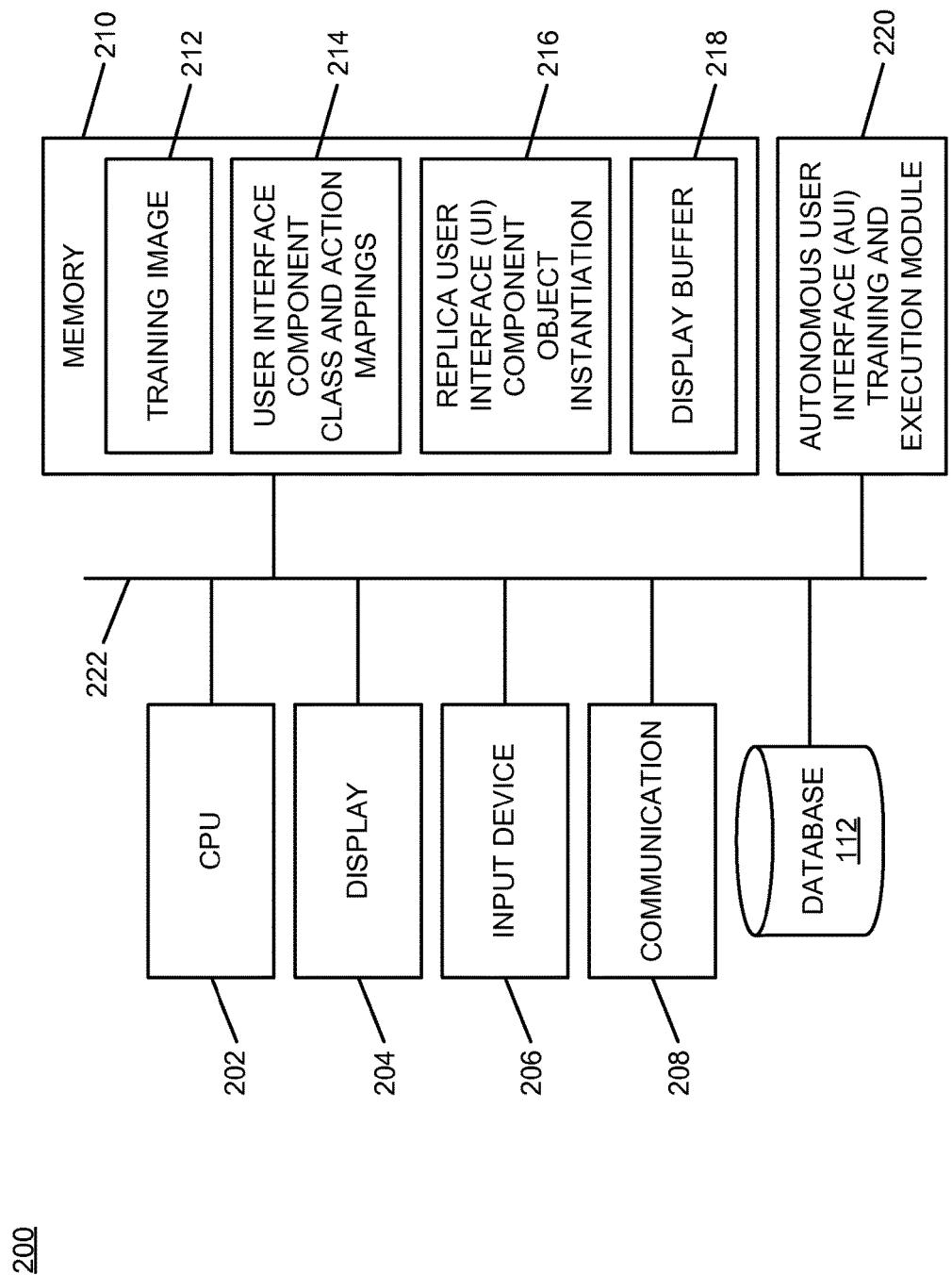
FIG. 2 is a block diagram of an example of an implementation of a core processing module capable of performing computer-vision based execution of graphical user interface (GUI) application actions according to an embodiment of the present subject matter.

FIG. 2 is a block diagram of an example of an implementation of a core processing module 200 capable of performing computer-vision based execution of graphical user interface (GUI) application actions. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter. Further, the core processing module 200 may be implemented as an embedded processing device with circuitry designed specifically to perform the processing described herein as appropriate for a given implementation.

Further, the core processing module 200 may provide different and complementary processing of computer-vision based execution of graphical user interface (GUI) application actions in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation. It should additionally be noted that the input device 206 may be replaced (and rendered obsolete) for certain implementations of the computer-vision based execution of graphical user interface (GUI) application actions described herein.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes a training image storage area 212. The training image storage area 212 stores user interface training images as described above within the core processing module 200.

The memory 210 also includes a user interface component class and action mappings storage area 214 that stores mappings between user interface components and their classes and actions, respectively, that may be generated by instantiated objects of the user interface components. The interface component class and action mappings may be utilized in conjunction with the training images to identify appropriate actions to provide via the operating system (OS) to an application during runtime.

The memory 210 further includes a replica user interface (UI) component object instantiation area 216. The replica UI component object instantiation area 216 provides a memory area within which replica UI components may be instantiated as stand-alone objects, as described above, and used to generate operating system-level events to an executing application during runtime.

The memory 210 also includes a display buffer area 218. As described above, the display buffer area 218 may include multiple buffered screenshot display images that may be utilized to process inputs to application UI components and/or applications regardless of whether the respective application UI components are in "focus" within a GUI. As described above, inputs may be provided to the respective applications without requiring the respective UI components to be brought into "focus" within the GUI.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter. It is understood that the memory 210 also includes an application execution storage area as described herein where applications may execute during runtime and be provided with operating system-level events generated by replica UI component object instances.

An autonomous user interface (AUI) training and execution module 220 is also illustrated. The AUI training and execution module 220 provides both the training and execution stages of processing for the core processing module 200, as described above and in more detail below. The AUI training and execution module 220 implements the automated computer-vision based execution of graphical user interface (GUI) application actions of the core processing module 200, and is considered an AUI controller as described above and in more detail below.

The AUI training and execution module 220 may include each of a GUI classifier module, an AUI controller analyzer module, and an AUI execution analytical module as described above. The functionality of the respective sub-modules of the AUI training and execution module 220 is described in detail above.

It should also be noted that the AUI training and execution module 220 may form a portion of other circuitry described without departure from the scope of the present subject matter. The AUI training and execution module 220 may form a portion of an interrupt service routine (ISR), a portion of an operating system, or a portion of an application without departure from the scope of the present subject matter. The AUI training and execution module 220 may also include an embedded device with circuitry designed specifically to perform the processing described herein as appropriate for a given implementation.

The database 112 is again shown within FIG. 2 associated with the core processing module 200. As such, the database 112 may be operatively coupled to the core processing module 200 without use of network connectivity, as appropriate for a given implementation.

The CPU 202, the display 204, the input device 206, the communication module 208, the memory 210, the AUI training and execution module 220, and the database 112 are interconnected via an interconnection 222. The interconnection 222 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many other possible arrangements for components of the core processing module 200 are possible and all are considered within the scope of the present subject matter. It should also be understood that, though the database 112 is illustrated as a separate component for purposes of example, the information stored within the database 112 may also/alternatively be stored within the memory 210 without departure from the scope of the present subject matter. Accordingly, the core processing module 200 may take many forms and may be associated with many platforms.

Figure 3:
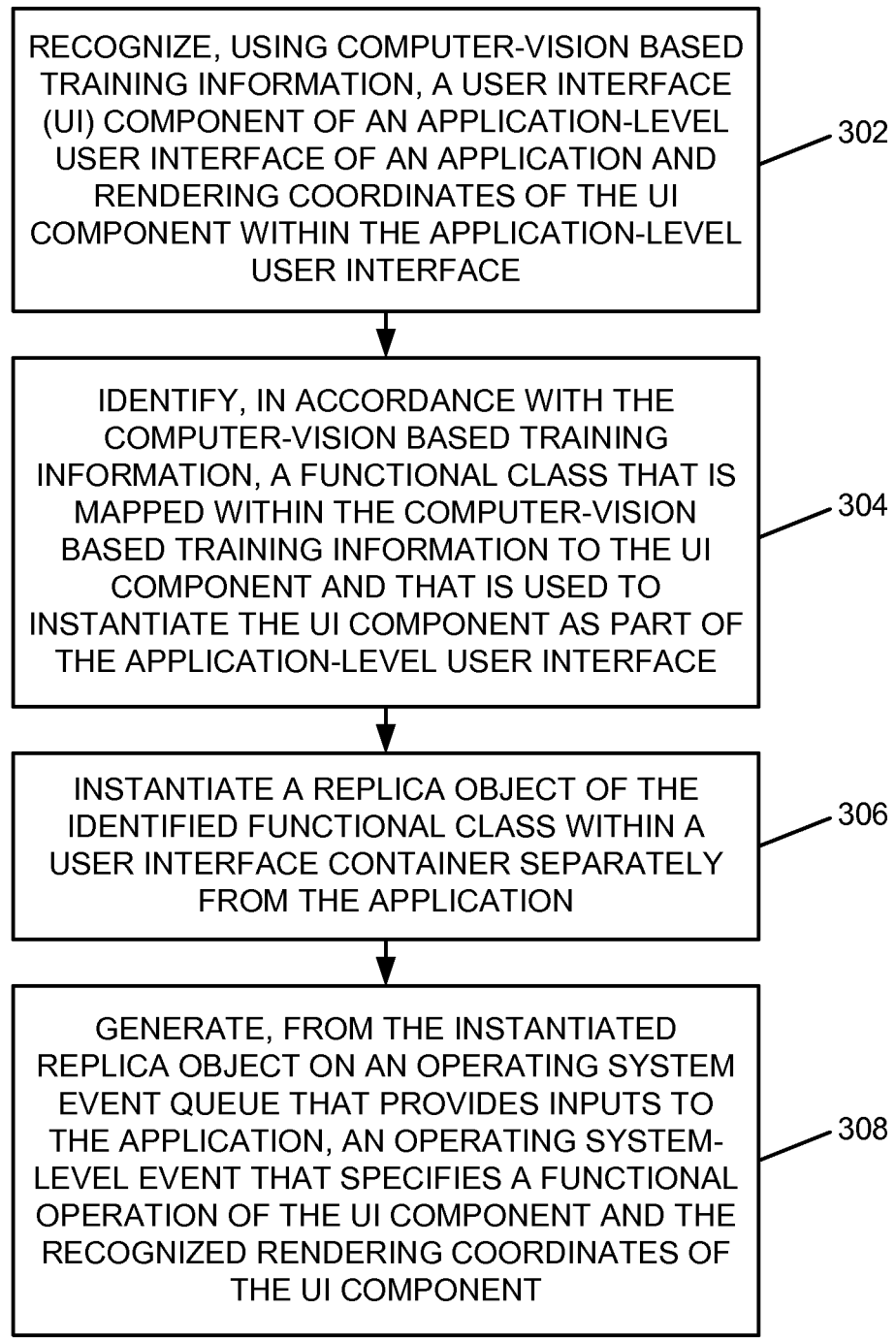
FIG. 3 is a flow chart of an example of an implementation of a process for computer-vision based execution of graphical user interface (GUI) application actions according to an embodiment of the present subject matter.
Figure 4:
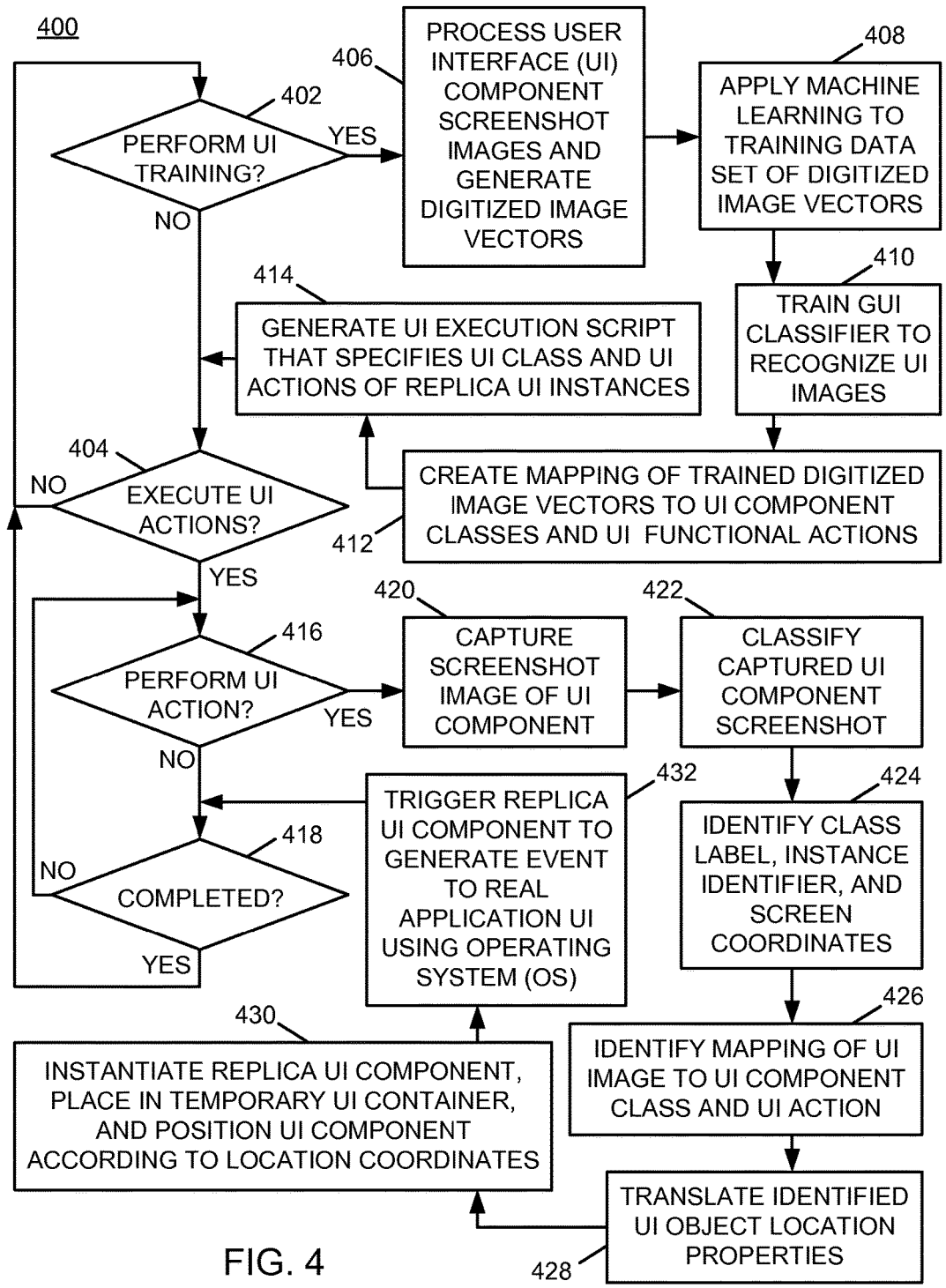
FIG. 4 is a flow chart of an example of an implementation of a process for computer-vision based execution of graphical user interface (GUI) application actions that provides additional details of each of the training stage and the execution stage according to an embodiment of the present subject matter.

FIG. 3 through FIG. 4 described below represent example processes that may be executed by devices, such as the core processing module 200, to perform the automated computer-vision based execution of graphical user interface (GUI) application actions associated with the present subject matter. Many other variations on the example processes are possible and all are considered within the scope of the present subject matter. The example processes may be performed by modules, such as the AUI training and execution module 220 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for computer-vision based execution of graphical user interface (GUI) application actions. The process 300 represents a computer-implemented method of performing the subject matter described herein. At block 302, the process 300 recognizes, using computer-vision based training information, a user interface (UI) component of an application-level user interface of an application and rendering coordinates of the UI component within the application-level user interface. At block 304, the process 300 identifies, in accordance with the computer-vision based training information, a functional class that is mapped within the computer-vision based training information to the UI component and that is used to instantiate the UI component as part of the application-level user interface. At block 306, the process 300 instantiates a replica object of the identified functional class within a user interface container separately from the application. At block 308, the process 300 generates, from the instantiated replica object on an operating system event queue that provides inputs to the application, an operating system-level event that specifies a functional operation of the UI component and the recognized rendering coordinates of the UI component.

FIG. 4 is a flow chart of an example of an implementation of a process 400 for computer-vision based execution of graphical user interface (GUI) application actions that provides additional details of each of the training stage and the execution stage described above. The process 400 represents a computer-implemented method of performing the subject matter described herein. At decision point 402, the process 400 begins higher level iterative processing between the training and execution stages by determining whether to perform UI training of an AUI controller for UI recognition. Training of the AUI controller may include training of the AUI execution analytical module, as described above and in more detail below. Affirmative processing associated with decision point 402 will be described in more detail further below. It should be noted that the process 400 is illustrated to allow the training stage to be reentrant. As such, training may be performed repeatedly over time as appropriate for a given implementation to improve training of the AUI controller.

To further the higher-level description, in response to determining at decision point 402 not to perform training of an AUI controller for UI recognition, the process 400 makes a determination at decision point 404 as to whether to enter the execution phase to execute autonomous UI actions according to autonomous UI training. Again, affirmative processing associated with decision point 404 will be described in more detail further below.

Returning to the description of decision point 402, in response to determining to perform training of an AUI controller for UI recognition, the process 400 creates computer-vision based training information by processing user interface (UI) component screenshot images and generating digitized image vectors as a training user interface data set at block 406. At block 408, the process 400 applies machine learning to the training user interface data set of digitized image vectors. Application of the machine learning to the training user interface data set may include, among other things as described herein, applying multi-label classifiers and dimensionality reduction algorithms to the digitized image vectors.

At block 410, the process 400 trains a graphical user interface (GUI) classifier module to recognize user interface images by use of the digitized image vectors. At block 412, the process 400 creates a mapping within the computer-vision based training information of the trained digitized image vectors to user interface component classes and user interface functional actions of the user interface classes. At block 414, the process 400 generates a user interface execution script that specifies the user interface class used to instantiate the respective replica user interface object instances and the user interface functional actions (e.g., methods) of the replica user interface object instances instantiated during the execution stage, as described in more detail below. As such, the process 400 creates the computer-vision based training information usable during the execution phase of autonomous UI processing, as described above and in more detail below. The process 400 returns to decision point 404 and iterates as described above.

Returning to the description of decision point 404, in response to determining to enter the execution phase to execute autonomous UI actions according to autonomous UI training, the process 400 makes a determination as to whether to perform a UI action at decision point 416. In response to determining not to perform a UI action at decision point 416, the process 400 makes a determination at decision point 418 as to whether execution phase processing is completed. In response to determining that execution phase processing is not completed at decision point 418, the process 400 returns to decision point 416 to again determine whether to perform a UI action.

In response to determining to perform a UI action at decision point 416, the process 400 captures a screenshot image of a UI component at block 420. The capturing of the screenshot image of the UI component may include capturing rendering data of the UI component from a display buffer. It should further be noted that where multiple applications are executing, the processing may include processing screen images for an application that is in focus or for an application that is not currently in focus. As described above, the display buffer may include one of multiple display buffers, and may include a display buffer that is associated with a non-focused display view of an application. As such, the process 400 may recognize the UI component of the application-level user interface within one of a plurality of display buffers that is associated with a non-focused display view.

At block 422, the process 400 classifies the captured rendering data of the UI component based upon a user interface component type in accordance with the computer-vision based training information. At block 424, the process 400 identifies, by the user interface component type, a class label and instance identifier of the UI component mapped within the computer-vision based training information, and identifies screen coordinates of the UI component within the rendering data of the UI component (e.g., a location of the button, etc.).

At block 426, the process 400 identifies the mapping of the UI image to a UI component class and UI action created within the computer-vision based training information during the training/mapping stage. As such, the process 400 may identify the functional class within the computer-vision based training information using an instance identifier of the UI component identified from captured rendering data of the UI component.

At block 428, the process 400 translates the identified UI object location properties during runtime to determine an absolute location at which to instantiate a replica component within a temporary UI container. At block 430, the process 400 instantiates a replica UI component and places the instantiated replica UI component within a temporary UI container at the determined absolute location within the UI container according to the location coordinates. As such, the process 400 instantiates a replica object of the identified functional class within a user interface container separately from the application.

At block 432, the process 400 triggers the instantiated replica user interface object/component to generate an event to the real application UI component using/via the operating system (OS) on which the real application is executing. As described above, the process 400 may execute a user interface execution script that defines/specifies the user interface functional operation using a method of a class of the replica object. The process 400 may trigger, using the specified functional operation, generation by the instantiated replica object of a user interface object event on the operating system event queue that provides inputs to the real/target application to invoke the operating system-level event that specifies the recognized and instantiated rendering coordinates of the UI component. Further, where multiple applications are executing, the process 400 may generate the operating system-level event from the instantiated replica object as a non-focus-based input to an application that is not in focus without bringing the application-level user interface into focus within the GUI, and another in-focus application may retain the focus within the GUI to receive operating system inputs generated by a separate input device. As such, the technology described herein may be utilized to provide inputs to multiple applications without changing the focus of the respective applications.

The process 400 returns to decision point 418 to determine whether execution stage processing is completed. In response to determining that execution stage processing is not completed, the process 400 iterates as described above to perform more UI actions by returning to decision point 416. In response to determining that execution stage processing is completed at decision point 418, the process 400 returns to decision point 402 and iterates as described above.

As such, the process 400 provides an autonomous UI training stage that trains an AUI controller to perform autonomous application inputs to one or more applications. The process 400 further provides an execution stage that processes UI component rendering information, determines UI classes to instantiate to create replica UI components within a temporary UI container identical to but separate from recognized UI components of the application, and drives operating-system level events to one or more real/target applications from the instantiated replica component. The process 400 may further provide autonomous inputs to multiple applications without changing GUI focus of the respective applications.

As described above in association with FIG. 1 through FIG. 4, the example systems and processes provide computer-vision based execution of graphical user interface (GUI) application actions. Many other variations and additional activities associated with computer-vision based execution of graphical user interface (GUI) application actions are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method, comprising:
   recognizing, using computer-vision based training information, a user interface (UI) component of an application-level user interface of an application and rendering coordinates of the UI component within the application-level user interface;
   identifying, in accordance with the computer-vision based training information, a functional class that is mapped within the computer-vision based training information to the UI component and that is used to instantiate the UI component as part of the application-level user interface;
   instantiating a replica object of the identified functional class within a user interface container separately from the application; and
   generating, from the instantiated replica object on an operating system event queue that provides inputs to the application, an operating system-level event that specifies a functional operation of the UI component and the recognized rendering coordinates of the UI component;
   where generating, from the instantiated replica object on the operating system event queue that provides the inputs to the application, the operating system-level event that specifies the functional operation of the UI component and the recognized rendering coordinates of the UI component comprises:
      executing a user interface execution script that specifies the functional operation of the UI component using a method of a class of the instantiated replica object; and
      triggering, using the specified functional operation, generation by the instantiated replica object of a user interface object event on the operating system event queue that provides the inputs to the application to invoke the operating system-level event that specifies the recognized rendering coordinates of the UI component.

2. The computer-implemented method of claim 1, where recognizing, using the computer-vision based training information, the user interface (UI) component of the application-level user interface of the application and the rendering coordinates of the UI component within the application-level user interface comprises:
   capturing rendering data of the UI component;
   classifying the captured rendering data of the UI component according to a user interface component type in accordance with the computer-vision based training information;
   identifying, by the user interface component type, a class label and an instance identifier of the UI component mapped within the computer-vision based training information; and
   identifying screen coordinates of the UI component within the rendering data of the UI component.

3. The computer-implemented method of claim 1, where identifying, in accordance with the computer-vision based training information, the functional class that is mapped within the computer-vision based training information to the UI component and that is used to instantiate the UI component as part of the application-level user interface comprises:
    identifying the functional class within the computer-vision based training information using an instance identifier of the UI component identified from captured rendering data of the UI component.

4. The computer-implemented method of claim 1, where the application comprises a first application that is not in focus within a graphical user interface (GUI) to receive operating system inputs generated by an input device, where a second application is in focus within the GUI to receive operating system inputs generated by the input device, and where:
    recognizing, using the computer-vision based training information, the UI component of the application-level user interface of the application and the rendering coordinates of the UI component within the application-level user interface comprises:
        recognizing the UI component of the application-level user interface within one of a plurality of display buffers that is associated with a non-focused display view; and
    generating, from the instantiated replica object on the operating system event queue that provides the inputs to the application, the operating system-level event that specifies the functional operation of the UI component and the recognized rendering coordinates of the UI component comprises:
        generating the operating system-level event from the instantiated replica object as a non-focus-based input to the application without bringing the application-level user interface into focus within the GUI, where the second application retains the focus within the GUI to receive operating system inputs generated by the input device.

5. The computer-implemented method of claim 1, further comprising creating the computer-vision based training information.

6. The computer-implemented method of claim 5, where creating the computer-vision based training information comprises:
    generating, by processing UI component training screenshot images, digitized image vectors as a training user interface data set;
    applying machine learning to the training user interface data set;
    training a graphical user interface (GUI) classifier module to recognize user interface images by use of the digitized image vectors;
    mapping the trained digitized image vectors to user interface classes and user interface functional actions of the user interface classes; and
    generating the user interface execution script, where the user interface execution script further specifies the user interface classes and the user interface functional actions of replica object instances instantiated from the user interface classes.

7. A system, comprising:
    a memory; and
    a processor programmed to:
        recognize, using computer-vision based training information in the memory, a user interface (UI) component of an application-level user interface of an application and rendering coordinates of the UI component within the application-level user interface;
        identify, in accordance with the computer-vision based training information, a functional class that is mapped within the computer-vision based training information to the UI component and that is used to instantiate the UI component as part of the application-level user interface;
        instantiate a replica object of the identified functional class within a user interface container separately from the application; and
        generate, from the instantiated replica object on an operating system event queue that provides inputs to the application, an operating system-level event that specifies a functional operation of the UI component and the recognized rendering coordinates of the UI component;
    where, in being programmed to generate, from the instantiated replica object on the operating system event queue that provides the inputs to the application, the operating system-level event that specifies the functional operation of the UI component and the recognized rendering coordinates of the UI component, the processor is programmed to:
        execute a user interface execution script that specifies the functional operation of the UI component using a method of a class of the instantiated replica object; and
        trigger, using the specified functional operation, generation by the instantiated replica object of a user interface object event on the operating system event queue that provides the inputs to the application to invoke the operating system-level event that specifies the recognized rendering coordinates of the UI component.

8. The system of claim 7, where, in being programmed to recognize, using the computer-vision based training information in the memory, the user interface (UI) component of the application-level user interface of the application and the rendering coordinates of the UI component within the application-level user interface, the processor is programmed to:
    capture rendering data of the UI component;
    classify the captured rendering data of the UI component according to a user interface component type in accordance with the computer-vision based training information;
    identify, by the user interface component type, a class label and an instance identifier of the UI component mapped within the computer-vision based training information; and
    identify screen coordinates of the UI component within the rendering data of the UI component.

9. The system of claim 7, where, in being programmed to identify, in accordance with the computer-vision based training information, the functional class that is mapped within the computer-vision based training information to the UI component and that is used to instantiate the UI component as part of the application-level user interface, the processor is programmed to:
    identify the functional class within the computer-vision based training information using an instance identifier of the UI component identified from captured rendering data of the UI component.

10. The system of claim 7, where the application comprises a first application that is not in focus within a graphical user interface (GUI) to receive operating system inputs generated by an input device, where a second application is in focus within the GUI to receive operating system inputs generated by the input device, and where:

in being programmed to recognize, using the computer-vision based training information in the memory, the UI component of the application-level user interface of the application and the rendering coordinates of the UI component within the application-level user interface, the processor is programmed to:

recognize the UI component of the application-level user interface within one of a plurality of display buffers within the memory that is associated with a non-focused display view; and in being programmed to generate, from the instantiated replica object on the operating system event queue that provides the inputs to the application, the operating system-level event that specifies the functional operation of the UI component and the recognized rendering coordinates of the UI component, the processor is programmed to:

generate the operating system-level event from the instantiated replica object as a non-focus-based input to the application without bringing the application-level user interface into focus within the GUI, where the second application retains the focus within the GUI to receive operating system inputs generated by the input device.

11. The system of claim 7, where the processor is further programmed to create the computer-vision based training information, the processor being programmed to:

generate, by processing UI component training screenshot images, digitized image vectors as a training user interface data set;

apply machine learning to the training user interface data set;

train a graphical user interface (GUI) classifier module to recognize user interface images by use of the digitized image vectors;

map the trained digitized image vectors to user interface classes and user interface functional actions of the user interface classes; and generate the user interface execution script, where the user interface execution script further specifies the user interface classes and the user interface functional actions of replica object instances instantiated from the user interface classes.

12. A computer program product, comprising:

a computer readable storage medium having computer readable program code embodied therewith, where the computer readable storage medium is not a transitory signal per se and where the computer readable program code when executed on a computer causes the computer to:

recognize, using computer-vision based training information, a user interface (UI) component of an application-level user interface of an application and rendering coordinates of the UI component within the application-level user interface;

identify, in accordance with the computer-vision based training information, a functional class that is mapped within the computer-vision based training information to the UI component and that is used to instantiate the UI component as part of the application-level user interface;

instantiate a replica object of the identified functional class within a user interface container separately from the application; and generate, from the instantiated replica object on an operating system event queue that provides inputs to the application, an operating system-level event that specifies a functional operation of the UI component and the recognized rendering coordinates of the UI component;

where, in causing the computer to generate, from the instantiated replica object on the operating system event queue that provides the inputs to the application, the operating system-level event that specifies the functional operation of the UI component and the recognized rendering coordinates of the UI component, the computer readable program code when executed on the computer causes the computer to:

execute a user interface execution script that specifies the functional operation of the UI component using a method of a class of the instantiated replica object; and trigger, using the specified functional operation, generation by the instantiated replica object of a user interface object event on the operating system event queue that provides the inputs to the application to invoke the operating system-level event that specifies the recognized rendering coordinates of the UI component.

13. The computer program product of claim 12, where, in causing the computer to recognize, using the computer-vision based training information, the user interface (UI) component of the application-level user interface of the application and the rendering coordinates of the UI component within the application-level user interface, the computer readable program code when executed on the computer causes the computer to:

capture rendering data of the UI component;

classify the captured rendering data of the UI component according to a user interface component type in accordance with the computer-vision based training information;

identify, by the user interface component type, a class label and an instance identifier of the UI component mapped within the computer-vision based training information; and identify screen coordinates of the UI component within the rendering data of the UI component.

14. The computer program product of claim 12, where, in causing the computer to identify, in accordance with the computer-vision based training information, the functional class that is mapped within the computer-vision based training information to the UI component and that is used to instantiate the UI component as part of the application-level user interface, the computer readable program code when executed on the computer causes the computer to:

identify the functional class within the computer-vision based training information using an instance identifier of the UI component identified from captured rendering data of the UI component.

15. The computer program product of claim 12, where the application comprises a first application that is not in focus within a graphical user interface (GUI) to receive operating system inputs generated by an input device, where a second application is in focus within the GUI to receive operating system inputs generated by the input device, and where:

in causing the computer to recognize, using the computer-vision based training information, the UI component of the application-level user interface of the application and the rendering coordinates of the UI component within the application-level user interface, the computer readable program code when executed on the computer causes the computer to:

recognize the UI component of the application-level user interface within one of a plurality of display buffers that is associated with a non-focused display view; and in causing the computer to generate, from the instantiated replica object on the operating system event queue that provides the inputs to the application, the operating system-level event that specifies the functional operation of the UI component and the recognized rendering coordinates of the UI component, the computer readable program code when executed on the computer causes the computer to:

generate the operating system-level event from the instantiated replica object as a non-focus-based input to the application without bringing the application-level user interface into focus within the GUI, where the second application retains the focus within the GUI to receive operating system inputs generated by the input device.

16. The computer program product of claim 12, where the computer readable program code when executed on the computer further causes the computer to create the computer-vision based training information.

17. The computer program product of claim 16, where, in causing the computer to create the computer-vision based training information, the computer readable program code when executed on the computer causes the computer to:

generate, by processing UI component training screenshot images, digitized image vectors as a training user interface data set;

apply machine learning to the training user interface data set;

train a graphical user interface (GUI) classifier module to recognize user interface images by use of the digitized image vectors;

map the trained digitized image vectors to user interface classes and user interface functional actions of the user interface classes; and generate the user interface execution script, where the user interface execution script further specifies the user interface classes and the user interface functional actions of replica object instances instantiated from the user interface classes.

\* \* \* \* \*